US008181159B2

(12) United States Patent
Khalil et al.

(10) Patent No.: US 8,181,159 B2
(45) Date of Patent: May 15, 2012

(54) TEST AUTOMATION USING VIRTUAL MACHINES

(75) Inventors: Manah M. Khalil, Redmond, WA (US); Arnab K. Ghosh, Redmond, WA (US)

(73) Assignee: Microsoft Corporation, Redmon, WA (US)

( * ) Notice: Subject to any disclaimer, the term of this patent is extended or adjusted under 35 U.S.C. 154(b) by 1447 days.

(21) Appl. No.: 11/693,599

(22) Filed: Mar. 29, 2007

(65) Prior Publication Data

US 2008/0244525 A1   Oct. 2, 2008

(51) Int. Cl.
*G06F 9/45* (2006.01)
(52) U.S. Cl. ........................................ 717/124
(58) Field of Classification Search .................. 717/124
See application file for complete search history.

(56) References Cited

U.S. PATENT DOCUMENTS

| 6,721,713 B1* | 4/2004 | Guheen et al. ............ 705/1.1 |
| 7,243,121 B2* | 7/2007 | Neiman et al. ............ 709/201 |
| 2006/0206882 A1* | 9/2006 | Illowsky et al. ............ 717/144 |

* cited by examiner

*Primary Examiner* — John Chavis
(74) *Attorney, Agent, or Firm* — Zete Law, P.L.L.C.; MacLane C. Key

(57) ABSTRACT

Techniques are described that perform software testing using virtual machines on dedicated or underutilized available computing devices. One or more virtual machines are identified as being sufficient to perform a test and availability of the one or more virtual machines is determined. The test is then executed on the one or more virtual machines when resources are available, thereby reducing the time and risks involved in using non-dedicated devices for testing.

20 Claims, 9 Drawing Sheets

TEST EXECUTION PROCESS
600

TEST AUTOMATION USING VIRTUAL MACHINES

BACKGROUND

An efficient and readily available test automation infrastructure is of primary importance to a software development enterprise. It can make the difference between shipping on time or slipping, as well as increasing confidence in the quality of a product.

As testing requirements for a product increase, demand for testing resources increases as well. It is usually difficult to dedicate enough computers solely for testing, so there is often a need to use computers for other purposes in addition to testing.

It can be difficult to manage computers used part-time for testing. Ensuring computers are available when needed, both for the test and for other uses, is time-consuming and can be error-prone. In such cases, it is often necessary to back up the existing data, re-image the computer to prepare for the test, and then revert to the previous state. This overhead and the possibility of errors causing data loss or testing-time loss prevent this from being an efficient use of the available resources.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a way to use virtual machines to test software. Multiple virtual machines may be installed on one computer, allowing for tests that may need more than one machine to be executed, or run, on one computer. Additionally, using virtual machines may allow simplified setup and restoring to pre-test status on computers shared with other uses. Virtual machines may also allow optimizing the use of resources from various physical computers.

Many of the attendant features may be more readily appreciated as the same becomes better understood by reference to the following detailed description considered in connection with the accompanying drawings.

DESCRIPTION OF THE DRAWINGS

The present description may be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe testing software using virtual machines. Although the present examples are described and illustrated herein as being implemented in client PCs and a test automation controller with a hard drive system, the system described is provided as an example and not a limitation. The present examples are suitable for application in a variety of different types of computing processors in various computer systems.

The present example provides a way for test automation controller to manage resources including virtual machines. The use of virtual machines provides a number of advantages in the process of testing software, including but not limited to making more resources available, providing flexibility in scheduling based on using different resources at different times, and allowing more flexibility in investigating test failures. Virtual machines may be installed and used without removing the host operating system and other applications on a personal computer, which may, for example, allow the use of office machines on an "as available" basis. High-powered computers dedicated to testing may have multiple virtual machines installed to enable running several tests at once, if none of the running tests needs the full resources available on the machine. By using a differential disk image, tests may be partially executed on one virtual machine while the virtual machine is available, and then continued on a different virtual machine when the first is no longer available. A differential disk image is one or more files or other storage means that contain the changes made to a disk between two points in time. For example, if a first snapshot is made of a first system, with a disk containing nothing but a base image comprising an operating system and a word processing application, and a second snapshot is made of the first system three days later, the second snapshot may contain additions or changes in applications or data that were made to the disk, including any documents that were created using the word processing software. The differences between the two snapshots may be stored in a differential disk image. Such a differential disk image may later be added to a second system prepared with the base image from the first snapshot, resulting in the second system having the same information on a disk as the first system had at the time the second snapshot was taken.

Exemplary Computing System

Figure 1:
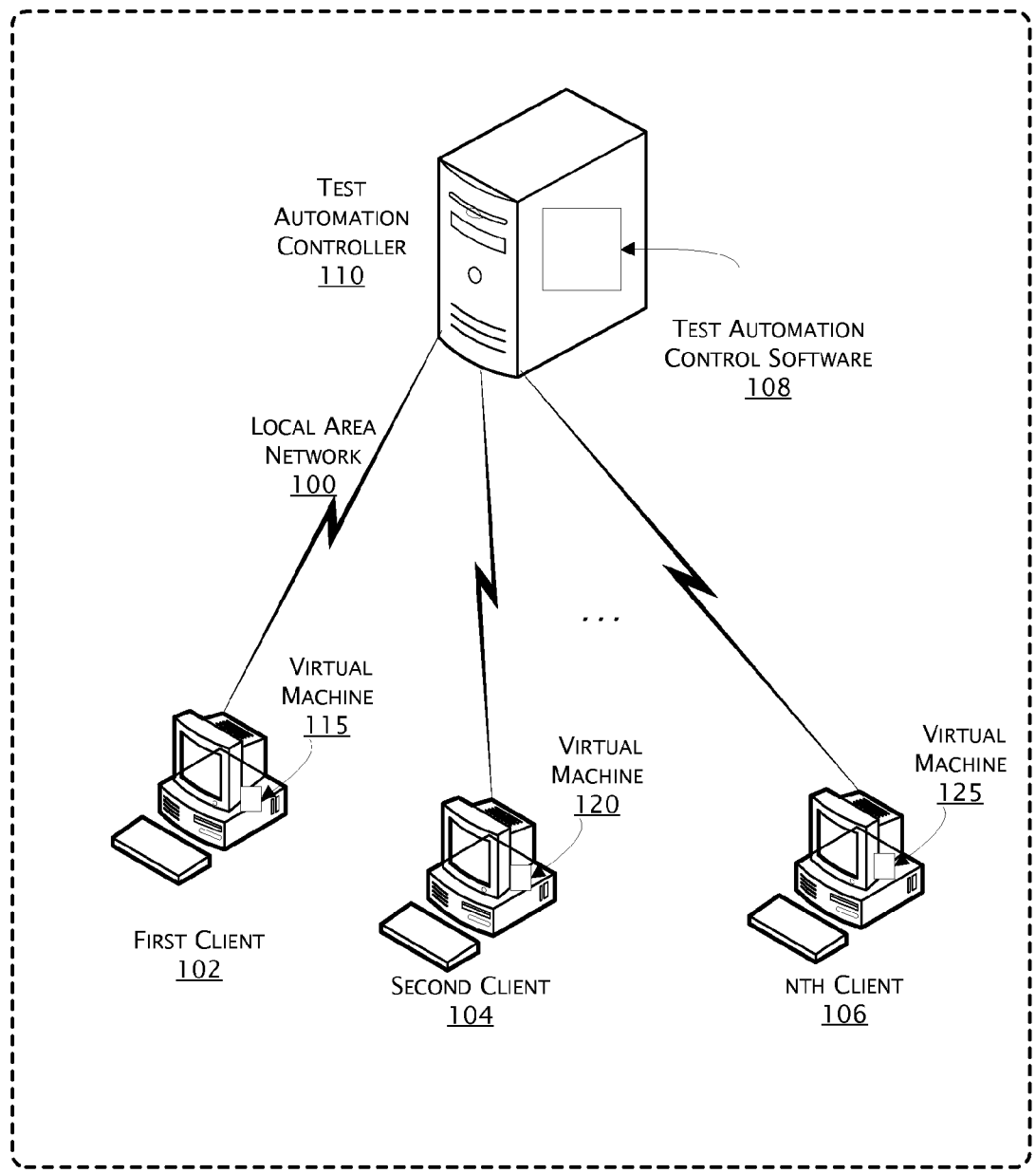
FIG. 1 is a block diagram of an example of a networked computing system with test automation control software capable of controlling virtual machines.

FIG. 1 is a block diagram of an example of a networked computing system operating environment in which a test automation controller contains test automation controller software capable of managing resources including virtual machines. In the following discussion, continuing reference may be made to elements and/or reference numerals contained in the previous figure.

Local area network 100 includes test automation controller 110 and multiple client computers 102, 104, 106. Although not shown here for the sake of clarity, the local area network 100 could also include a plurality of servers, hubs, switches, wireless access points, and other network devices, as well as any number of server and client computers.

Test automation controller 110 includes test automation control software 108. The test automation control software 108 is disposed on a mass storage device (not shown). Such a mass storage device can include individual hard drives or networked hard drives such as RAID (Redundant Array of Independent Disks) drives, flash drives, or the like.

Client computers 102, 104, 106 are shown as hosting virtual machine 115, virtual machine 120, and virtual machine 125, respectively. Any of the client computers 102, 104, 106 could host a plurality of virtual machines, allowing the most efficient use of the resources available. Each client computer may be dedicated to the testing process, or may be used for other applications as well.

Exemplary Client Computers/Virtual Machines

Figure 2:
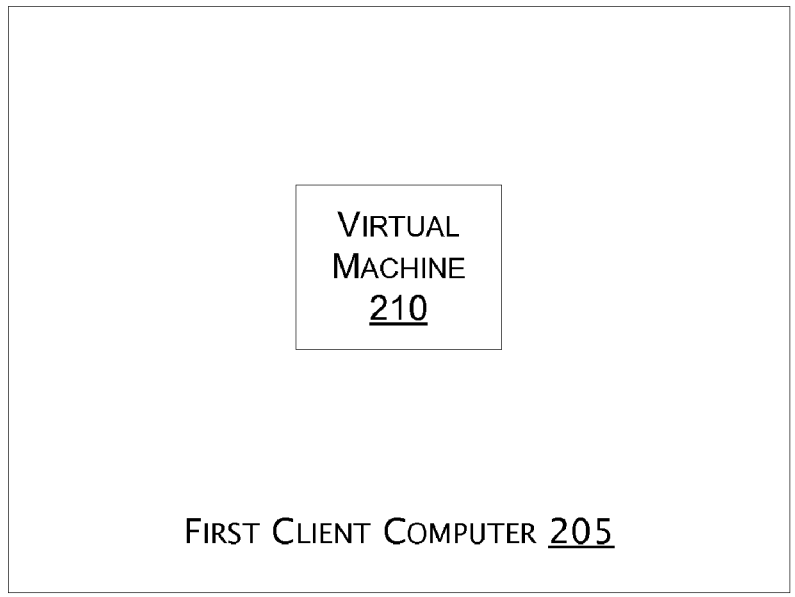
FIG. 2 is a block diagram of two example computers hosting virtual machines.
Figure 2:
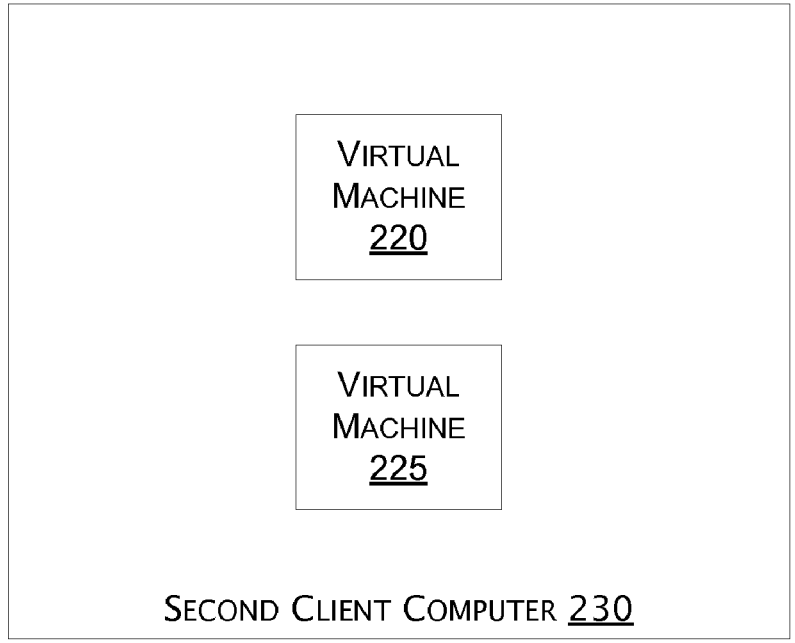

FIG. 2 is a block diagram of two example client computers hosting virtual machines. First client computer 205 hosts a single virtual machine (virtual machine 210), and second client computer 230 hosts two virtual machines, (virtual machine 220 and virtual machine 225). A virtual machine is software that mimics the functionality of a hardware device. One use of virtual machines is to allow various operating systems to be run on a host device. For example, client computer 230 could run a first operating system on virtual machine 220 and a second operating system on virtual machine 225. The first operating system and the second operating system could be two different operating systems or they may both be the same. With virtual machine software, an executing process, such as a test, may be run on a computer that is primarily used for other purposes, such as running business software, without requiring reconfiguring of the host computer each time a test is run. Virtual machine software may also be used to emulate a device on a different device, which may allow the testing of cell phone software on a personal computer, for example.

Exemplary Operating Environment Components

Figure 3:
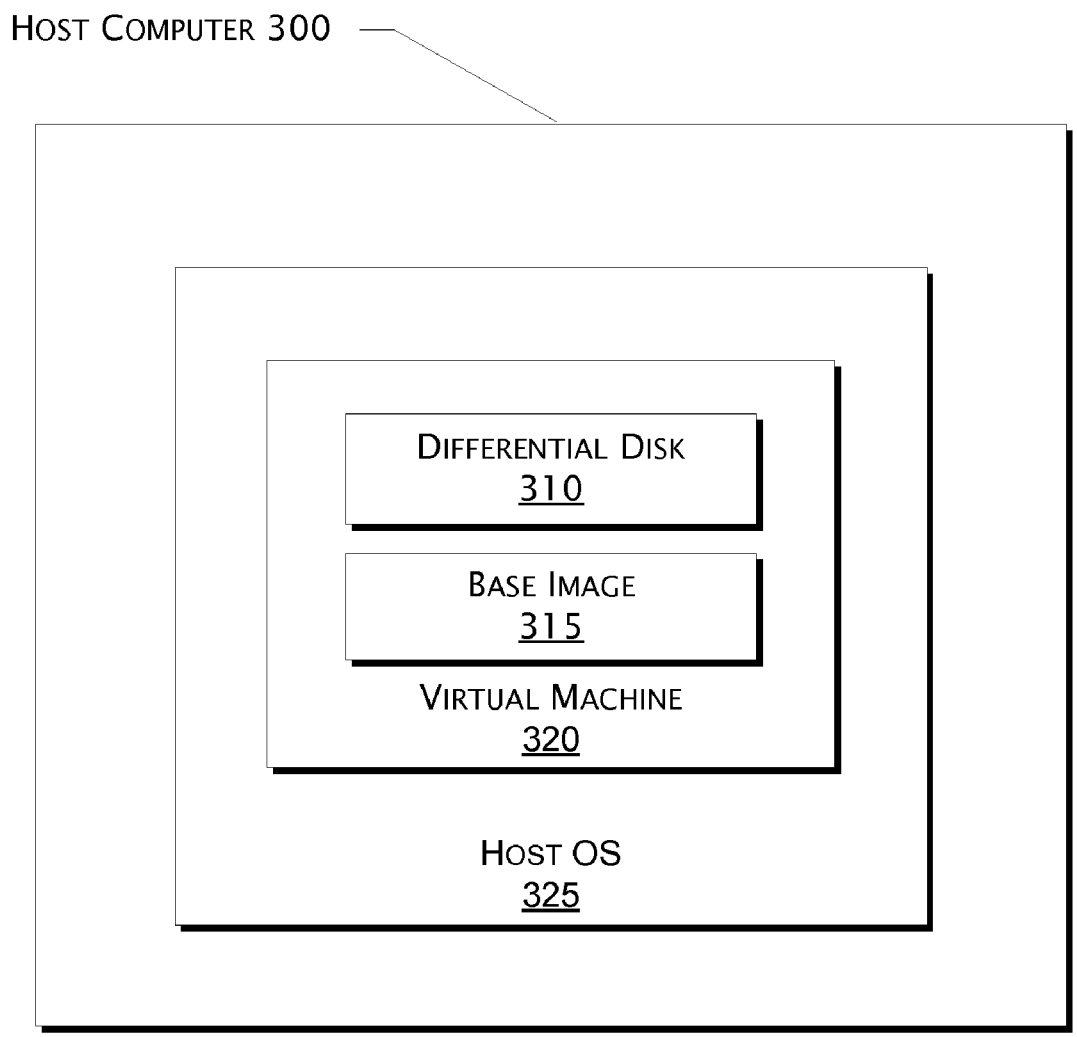
FIG. 3 is a block diagram of exemplary operating environment components.

FIG. 3 is a block diagram illustrating operating environment components that may be used in setting up a machine to support running tests on a virtual machine. Host computer 300 is running host OS 325. Virtual machine 320 is running on host OS 325. Base image 315, loaded on virtual machine 320, may comprise an operating system, applications or other software, and configuration information. Differential disk 310 may contain the test or tests to be run, various configuration information, data from a partially run test, or any other data that is relevant to running the target test or tests on this virtual machine.

Resource Availability Timeline

Figure 4:
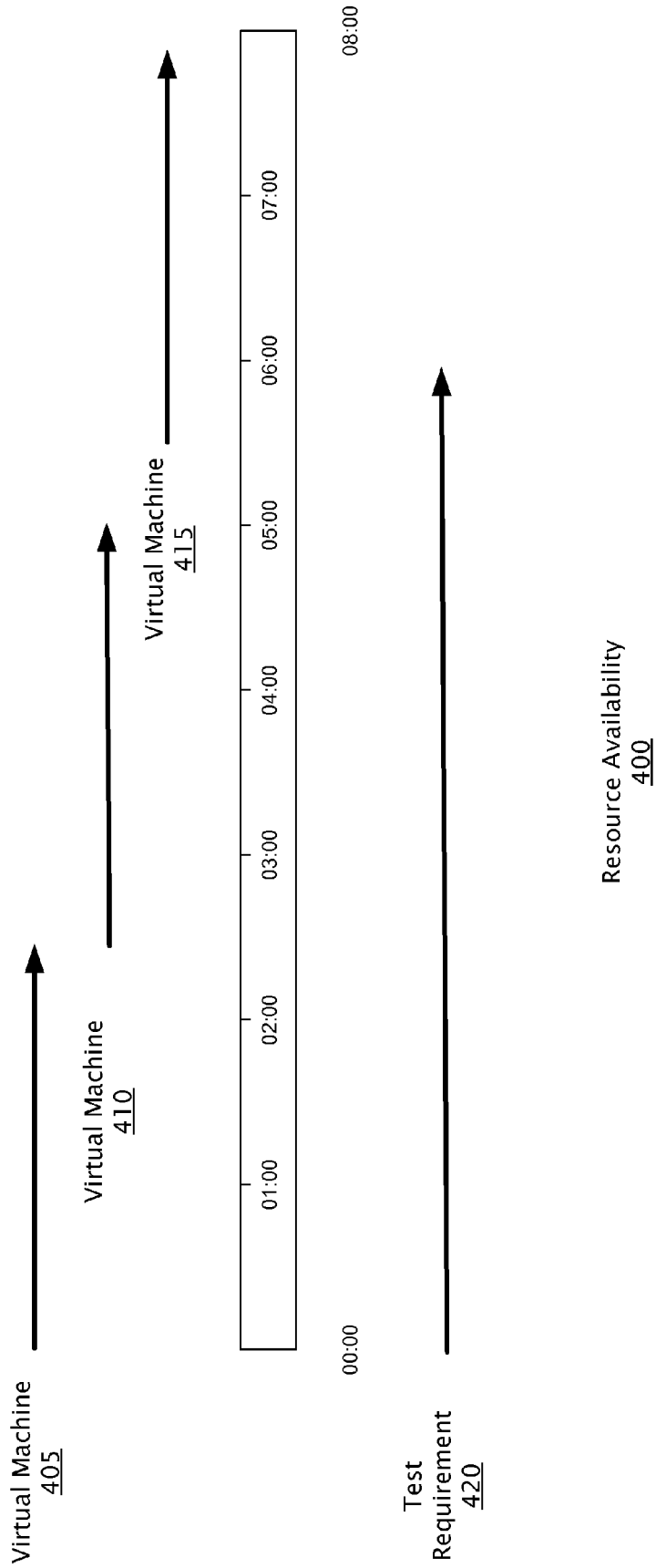
FIG. 4 is an exemplary timeline showing resource availability for a test.

FIG. 4 is an example of a timeline of resource availability 400. In this example, virtual machine 405 is available approximately 2.5 hours from the start of the time required for testing. Virtual machine 410 is available from approximately time mark 2.5 to time mark 5, and virtual machine 415 from approximately 5.5 to 8.0. Because the longest time available for any one of these virtual machines is two and one half hours, a test requirement 425 of six hours may not be able to be execute on any one of these virtual machines. However, virtual machine software which enables the capture of a differential disk image may allow a test to run on virtual machine 405 for the time it is available, then have a "snapshot" (a copy of the current disk, memory, or any other type of status information) taken, and the resulting differential disk image loaded on virtual machine 410 to continue the run.

At the end of the time virtual machine 410 is available; another snapshot may be taken and loaded on virtual machine 415 when virtual machine 415 becomes available. Overall, the test run may take 6.5 hours or more to complete, since there is no virtual machine available from the 5.0 to 5.5 hour time slot, but it may be able to execute to completion which it could not otherwise do on the available resources.

This is only one example of many different resource availability possibilities. At any given time there may none or a plurality of virtual machines available and there may or may not be overlap between the various available times. Additionally, different virtual machines may have different resources available. The amount of hard disk space, the amount of RAM, or any other requirement may influence which virtual machine or machines on which a particular test may be executed, or how long it may take a test to run on that virtual machine.

Exemplary Test Automation Infrastructure

Figure 5:
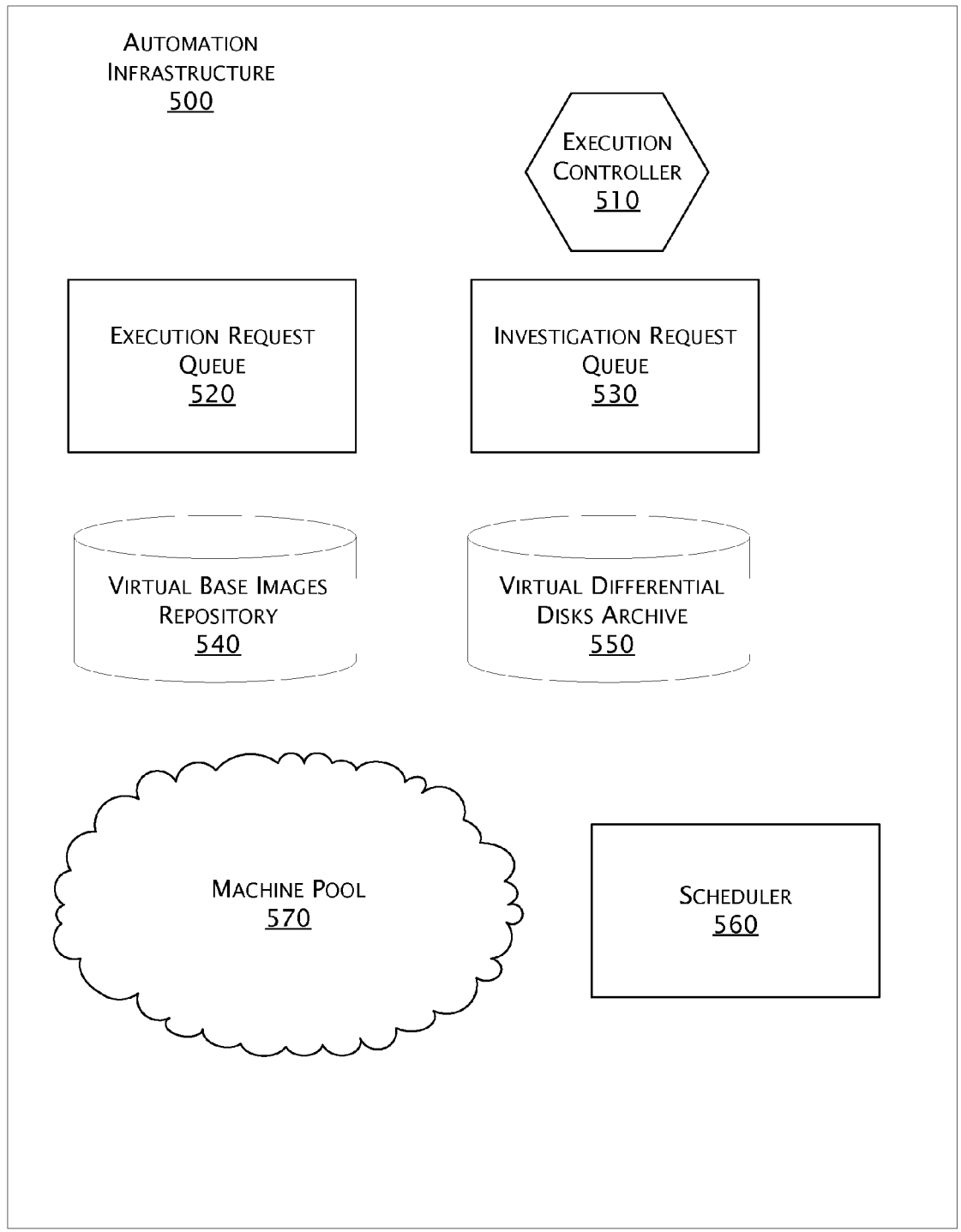
FIG. 5 is a block diagram of one exemplary implementation of an automation infrastructure.

FIG. 5 is a block diagram showing components of one implementation of a test automation infrastructure 500. Execution controller 510 may comprise software, hardware, or both, that manages the overall testing processes. Execution request queue 520 is a list of test runs that have been requested, along with each test's resource requirements and an estimate of the time required to run the test. Investigation request queue 530 is a list of requests to investigate previously-run test cases.

Virtual base images repository 540 contains images of base configurations for various test configurations. Test configurations may comprise an operating system with a particular configuration, as well as software that may be required or desired to execute a test, or the like. Virtual differential disks archive 550 contains a set of images created from or for test runs.

For example, before a run starts, the test's requestor may want a particular file opened in a word processing program; that information may be stored in a differential disk image. If a test run has started but did not finish in the available time on a virtual machine, a differential disk image may be taken so that the test may be continued on another virtual machine at a later time. Differential disk images may be copied to the virtual machine executing a test or investigation, they may be "attached" via a network drive, or they may be stored on a removable drive, a portable hard drive, a flash drive, or the like. Differential disk images may be stored on one storage device, or may be spread out across more than one storage device. Multiple differential disk images may also be stored on a single storage device. A storage device may store other applications, data, or the like in addition to storing one or more differential disk images.

Machine pool 570 comprises machines that are available for running tests. A list of machines in the pool may be stored with the times that the machines are available and information about the resources each machine has. The scheduler 560 determines which machines to use to execute the various test runs and investigations.

In this example, execution controller 510 obtains execution requests from the execution request queue 520 or investigation request queue 530. Once a request is obtained, machine pool 570 is examined to determine which virtual machine or machines may meet the requirements for the requested execution or investigation. The execution controller then has the scheduler 560 schedule the execution or investigation on the appropriate machines with the appropriate virtual base images from repository 540, and proper differential disk images from the virtual differential disk archive 550. When the execution is complete, the execution controller notifies the requester, such as a test developer, that the request has been fulfilled, and provides information about the run, such as test pass, test failure, investigation complete, or the like.

Such an infrastructure may be split over several physical machines, including server computers, client computers, or other types of devices. Alternatively, all of the functions may be provided on one host, allowing a single machine to manage the execution of a test on one or more self-hosted virtual machines.

Exemplary Methodological Implementation: Test Execution Using Virtual Machine

Figure 6:
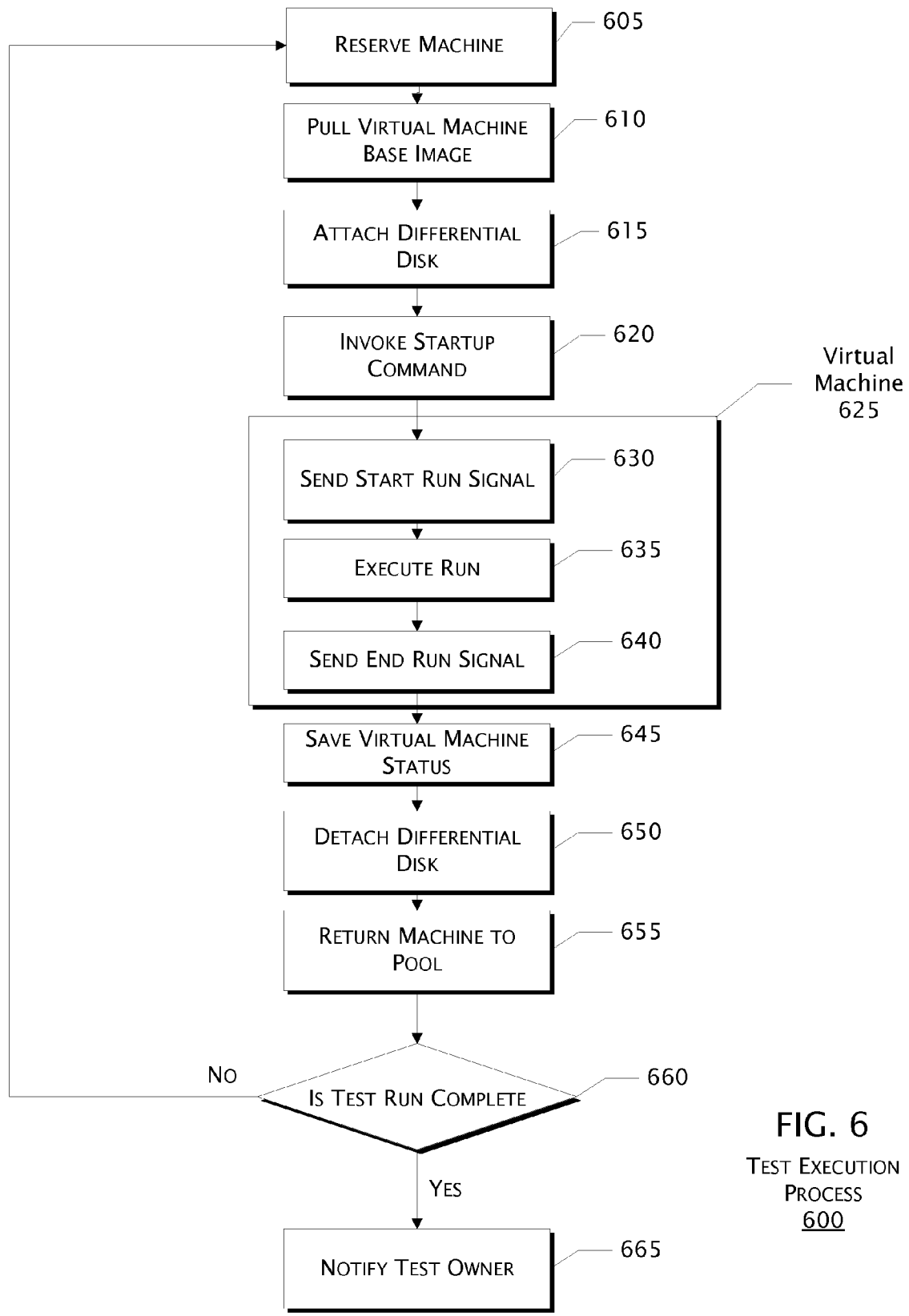
FIG. 6 is a flowchart of an exemplary implementation for scheduling and running a test.

FIG. 6 is a flow chart of an example process 600 for executing a test run using virtual machines. Such a process may be manually started, or may be initiated by a scheduling process, which may be included in a test automation framework. Continuing reference to reference numerals included in previous figures are used in the following description.

A host machine is reserved from the machine pool at block 605, and the desired virtual machine base image is installed from the virtual base images repository 540 (block 610). A differential disk is selected from the virtual differential disks archive 550 and attached at block 615. In this example, the differential disk image is attached as a network drive may be, but in alternate implementations the image may be copied to the virtual machine over the network, accessed from a removable disk, installed via a CD or DVD, or any other means of making the image available to the virtual machine. A test startup command is invoked at block 620, which begins the execution of the test on virtual machine 625. This startup command may include the executable test file, along with parameters and other information passed to the test at execution time, and the like. A start run signal is sent to the virtual machine by the execution controller at block 630 and the test is executed in block 635.

At the end of the test run, or when the available time has run out for the machine, an end run signal is sent to the virtual machine by the execution controller at block 640. The virtual machine status is saved at block 645 and the differential disk is detached at block 650. In alternate implementations, the differential disk may be copied back to the virtual base image repository, a new CD burned, or any other means of making the virtual disk image available to another virtual machine may be used. The host machine is returned to a machine pool 570 at block 655. At block 660 the status of the test run is queried. If the test run is complete ("Yes" branch, block 660), the test owner is notified at block 665. The test run may complete by finishing successfully, by stopping due to a test run failure, or the like. If the test is not complete ("No" branch, block 660), the process is restarted on another available virtual machine at block 605.

It is noted that although the process 600 described above has been described in particular steps and in a particular order, such a process may be implemented in many different ways. It should be understood that while the process 600 indicates a particular order of operations, in other implementations the operations may be ordered differently. Similarly, operational flows according to other embodiments need not be restricted to the specific operations described with respect to FIG. 6. The steps of the process may be executed in different order, and the process may include fewer or more steps than those listed.

After the test is executed, an investigation may be desired. For example, if the test failed, the cause of failure may be determined by an investigation. When using virtual machines for testing, the investigation may not need to occur on the machine that the test had been run on. A differential disk image may allow an investigation to be completed on any virtual machine which meets the requirements that is available.

Machines available for testing or investigation may be kept in a virtual machine pool.

Exemplary Methodological Implementation: Virtual Machine Registration

Figure 7:
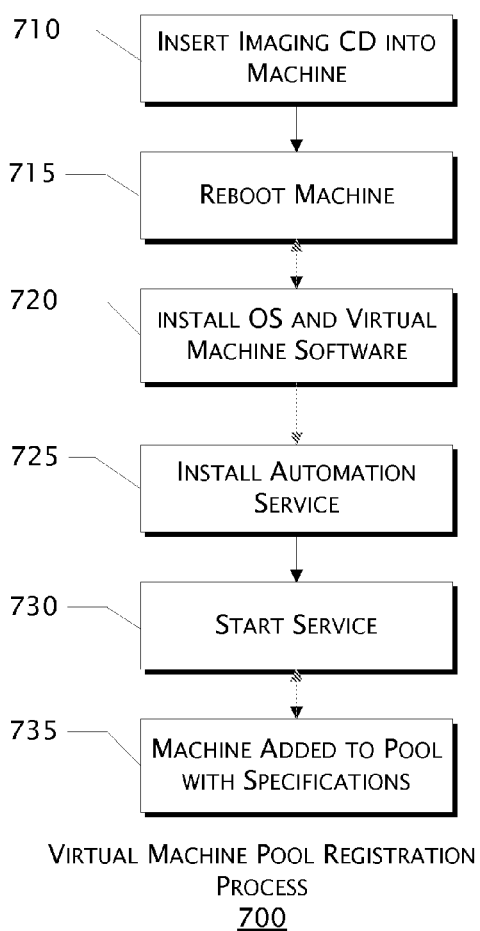
FIG. 7 is a flowchart of an exemplary implementation for registering a machine into a machine pool.

FIG. 7 is a flow chart of an example process 700 by which a virtual machine may be registered in a machine pool. At block 710, an imaging CD is inserted into a machine. Such an imaging CD automates the installation of other operating systems and other software onto a virtual machine. At block 715 the machine is rebooted, allowing software on the imaging CD to install the host operating system and virtual machine at block 720. Test automation services are installed at block 725 and started at block 730. The test automation service automatically adds the machine to the pool at block 735. There are many different ways to implement this process, including but not limited to manually configuring and adding the machine, or loading the OS and VM software over a network. It should be understood that while the process 700 indicates a particular order of operations, in other implementations the operations may be ordered differently. Similarly, operational flows according to other embodiments need not be restricted to the specific operations described with respect to FIG. 7. The steps of the process may be executed in different order, and the process may include fewer or more steps than those listed.

Exemplary Methodological Implementation: Virtual Machine Registration

Figure 8:
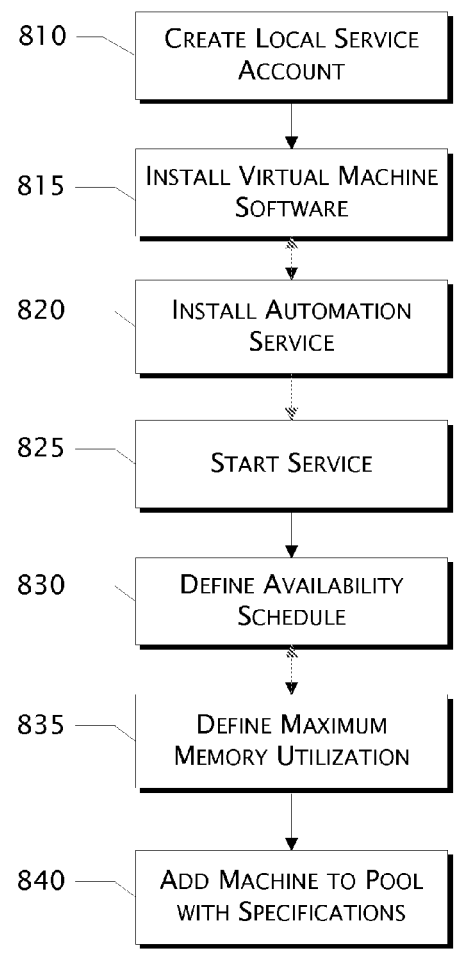
FIG. 8 is a flowchart of an alternative exemplary implementation for registering a machine into a machine pool.

FIG. 8 is a flow chart showing a process 800 for an alternate implementation of registering a virtual machine in a machine pool. A local service account is created at block 810 and virtual machine software is installed at block 815. Automation service software is installed at block 820 and started at block 825. An availability schedule is defined at block 830 and the maximum memory utilization is entered at block 835. The machine is added to the virtual machine pool with the specifications, or requirements, which include the memory and time availability information at block 840. This process may be implemented in many different ways, and may include data instead of or in addition to the availability schedule and the maximum memory utilization. It should be understood that while the process 800 indicates a particular order of operations, in other implementations the operations may be ordered differently. Similarly, operational flows according to other embodiments need not be restricted to the specific operations described with respect to FIG. 8. The steps of the process may be executed in different order, and the process may include fewer or more steps than those listed.

Exemplary Methodological Implementation: Requesting Test Execution

Figure 9:
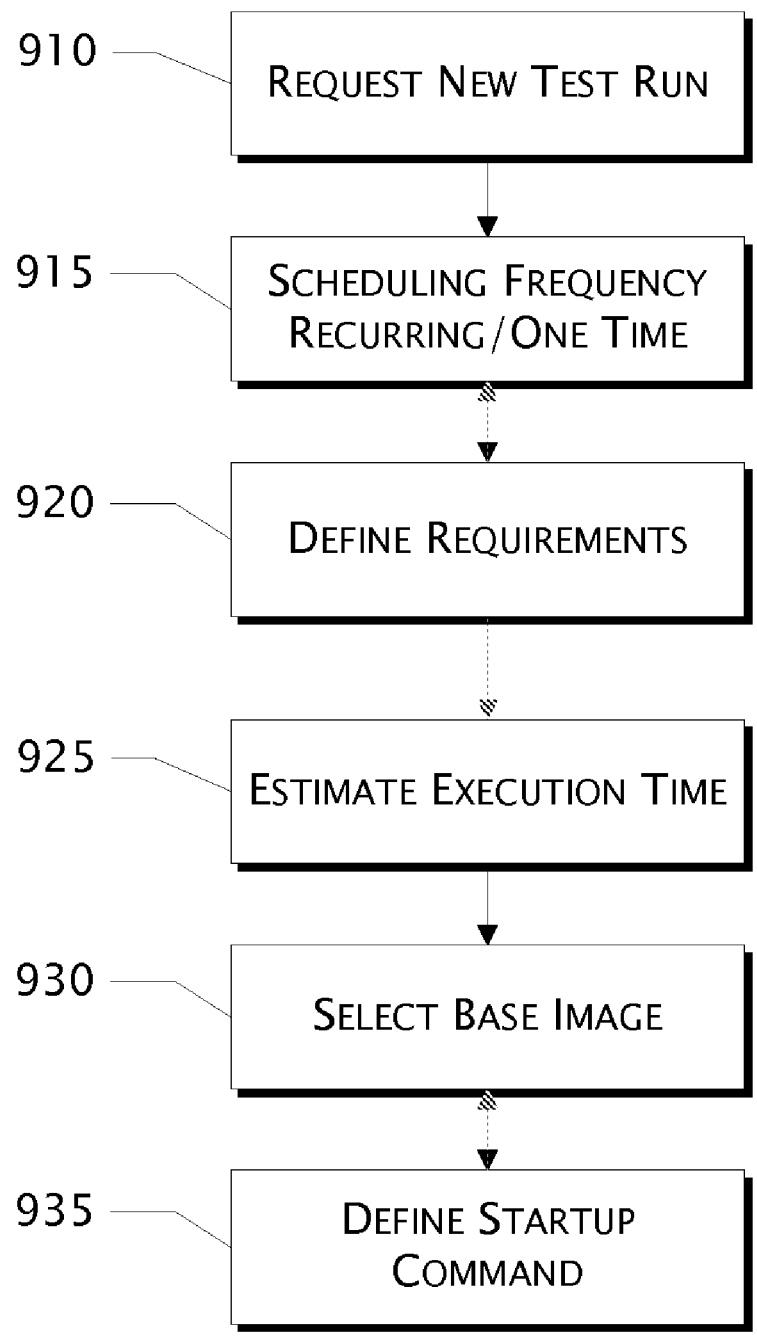
FIG. 9 is a flowchart of an exemplary implementation for requesting execution of a test.

FIG. 9 is a flow chart of an example of a process 900 for requesting a test execution. A new test run is requested at block 910 and an indication whether it is a one-time run or a recurring test is entered at block 915. At block 920, the requirements for the test run are defined and an estimate for how long the test will run is entered at block 925.

At block 930 a base virtual machine image is selected. Such an image may comprise the target operating system for the test, other software required or desired, and any other configuration data used to prepare for the test run. A startup command for the test is defined at block 935. This startup command may include the executable test file, along with parameters and other information passed to the test at execution time, and the like.

It is noted that the process described with regard to FIG. 9 may be implemented in many different ways, and may include data instead of or in addition to the requirements for the test run and the estimated execution time. It should be understood that while the process 900 indicates a particular order of operations, in other implementations the operations may be ordered differently. Similarly, operational flows according to other embodiments need not be restricted to the specific operations described with respect to FIG. 10. The steps of the process may be executed in different order, and the process may include fewer or more steps than those listed.

Exemplary Computing Environment

Figure 10:
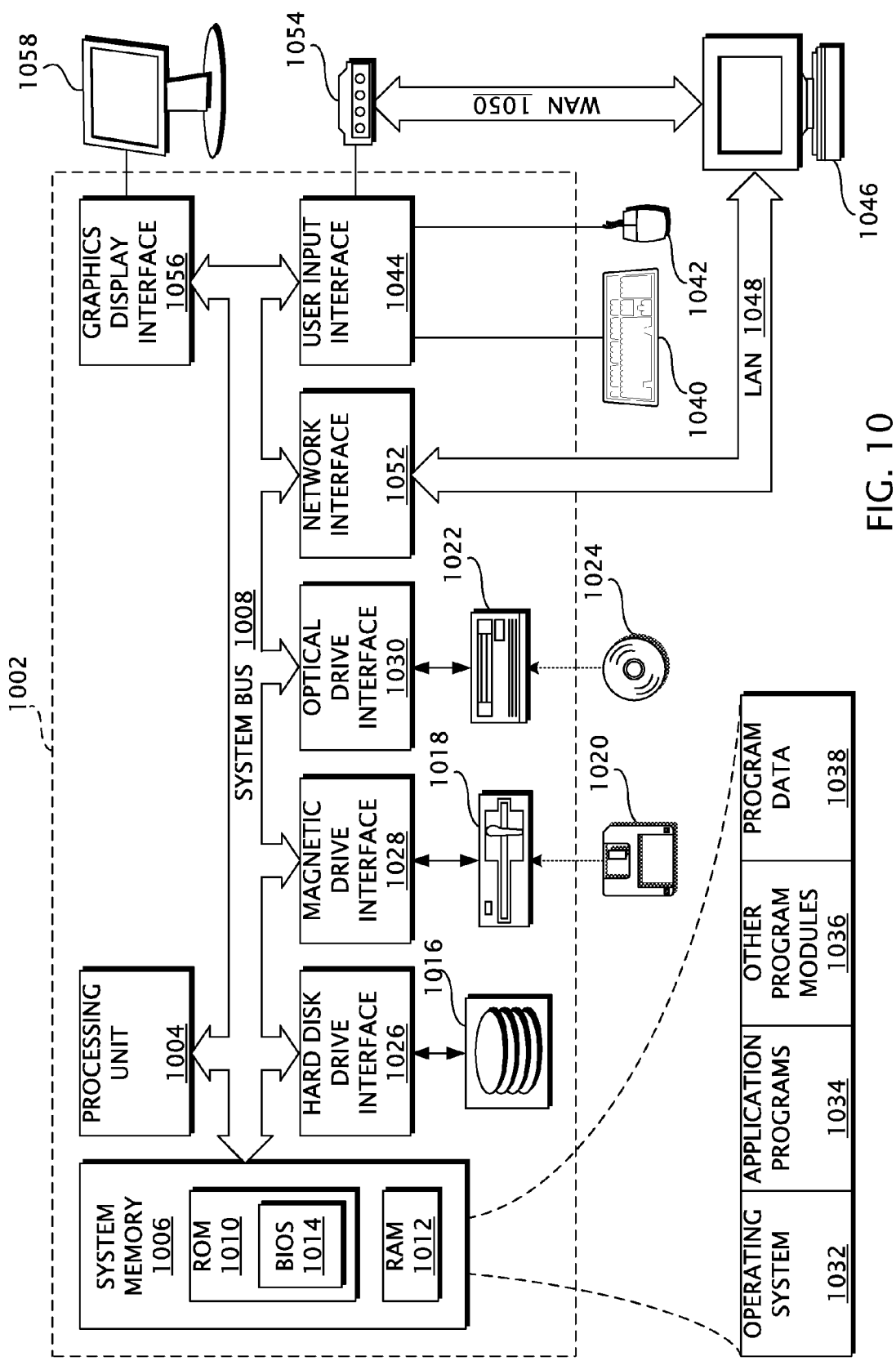
FIG. 10 is a block diagram which illustrates an exemplary computing environment in which the process for running a test on virtual machines may be implemented.

FIG. 10 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method or system may be described in the general context of computer-executable instructions, such as program modules, being executed by a computer. Generally, program modules include routines, programs, objects, components, data structures, etc. that perform particular tasks or implement particular abstract data types. The method or system may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the method or system includes a general purpose computing device in the form of a computer 1002. Components of computer 1002 may include, but are not limited to, a processing unit 1004, a system memory 1006, and a system bus 1008 that couples various system components including the system memory to the processing unit 1004. The system bus 1008 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1002 typically includes a variety of computer readable media. Computer readable media can be any available media that can be accessed by computer 1002 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1002. Combinations of the any of the above should also be included within the scope of computer readable storage media.

The system memory 1006 includes computer storage media in the form of volatile and/or nonvolatile memory such as read only memory (ROM) 1010 and random access memory (RAM) 1012. A basic input/output system 1014 (BIOS), containing the basic routines that help to transfer information between elements within computer 1002, such as during start-up, is typically stored in ROM 1010. RAM 1012 typically contains data and/or program modules that are immediately accessible to and/or presently being operated on by processing unit 1004. By way of example, and not limitation, FIG. 10 illustrates operating system 1032, application programs 1034, other program modules 1036, and program data 1038.

The computer 1002 may also include other removable/non-removable, volatile/nonvolatile computer storage media. By way of example only, FIG. 10 illustrates a hard disk drive 1016 that reads from or writes to non-removable, nonvolatile magnetic media, a magnetic disk drive 1018 that reads from or writes to a removable, nonvolatile magnetic disk 1020, and an optical disk drive 1022 that reads from or writes to a removable, nonvolatile optical disk 1024 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1016 is typically connected to the system bus 1008 through a non-removable memory interface such as interface 1026, and magnetic disk drive 1018 and optical disk drive 1022 are typically connected to the system bus 1008 by a removable memory interface, such as interface 1028 or 1030.

The drives and their associated computer storage media discussed above and illustrated in FIG. 10, provide storage of computer readable instructions, data structures, program modules and other data for the computer 1002. In FIG. 10, for example, hard disk drive 1016 is illustrated as storing operating system 1032, application programs 1034, other program modules 1036, and program data 1038. Note that these components can either be the same as or different from additional operating systems, application programs, other program modules, and program data, for example, different copies of any of the elements. A user may enter commands and information into the computer 1002 through input devices such as a keyboard 1040 and pointing device 1042, commonly referred to as a mouse, trackball or touch pad. Other input devices (not shown) may include a microphone, joystick, game pad, pen, scanner, or the like. These and other input devices are often connected to the processing unit 1004 through a user input interface 1044 that is coupled to the system bus, but may be connected by other interface and bus structures, such as a parallel port, game port or a universal serial bus (USB). A monitor 1058 or other type of display device is also connected to the system bus 1008 via an interface, such as a video interface or graphics display interface 1056. In addition to the monitor 1058, computers may also include other peripheral output devices such as speakers (not shown) and printer (not shown), which may be connected through an output peripheral interface (not shown).

The computer 1002 may operate in a networked environment using logical connections to one or more remote computers, such as a remote computer. The remote computer may be a personal computer, a server, a router, a network PC, a peer device or other common network node, and typically includes many or all of the elements described above relative to the computer 1002. The logical connections depicted in FIG. 10 include a local area network (LAN) 1048 and a wide area network (WAN) 1050, but may also include other networks. Such networking environments are commonplace in offices, enterprise-wide computer networks, intranets and the Internet.

When used in a LAN networking environment, the computer 1002 is connected to the LAN 1048 through a network interface or adapter 1052. When used in a WAN networking environment, the computer 1002 typically includes a modem 1054 or other means for establishing communications over the WAN 1050, such as the Internet. The modem 1054, which may be internal or external, may be connected to the system bus 1008 via the user input interface 1044, or other appropriate mechanism. In a networked environment, program modules depicted relative to the computer 1002, or portions thereof, may be stored in the remote memory storage device. By way of example, and not limitation, remote application programs may reside on a memory device. It will be appreciated that the network connections shown are exemplary and other means of establishing a communications link between the computers may be used.

The invention claimed is:

1. A method for testing software, comprising:
   selecting a test to execute;
   selecting a plurality of virtual machines, the plurality of virtual machines being available at different times, according to a timeline, to execute different portions of the test;
   executing a first portion of the test on a first virtual machine to derive a result;
   transferring the result to a second virtual machine using a differential disk image upon determining that execution of the test by the first virtual machine is incomplete, the differential disk image containing at least changes made to a disk between two points in time; and
   executing at least a second portion of the test on the second virtual machine using the differential disk image when the first virtual machine is no longer available to execute the test.

2. The method of claim 1 wherein the selecting a plurality of virtual machines is performed by:
   determining resources required for running the test; and
   selecting the plurality of virtual machines having the determined resources from a pool of virtual machines.

3. The method of claim 1 wherein the result is transferred from the first virtual machine to the second virtual machine using the differential disk image.

4. The method of claim 1 wherein at least one of the virtual machines is hosted on a computer also used for purposes other than testing.

5. The method of claim 1 further comprising:
   installing a virtual machine base image;
   installing configuration data required by the test; and
   invoking a startup command.

6. The method of claim 1 further comprising:
   deriving a second result from the second portion of the test;
   storing the second result; and
   investigating the test using the second result.

7. The method of claim 6 wherein investigating the test using the second result comprises:
   selecting one or more virtual machines;
   installing a virtual base image on the selected one or more virtual machines;
   transferring the second result to the selected one or more virtual machines; and
   investigating the second result.

8. The method of claim 7 wherein the second result is transferred from the second virtual machine to the selected one or more virtual machines using the differential disk image.

9. A system for testing software, comprising:
   one or more host computers each running one or more virtual machines;
   an identifying module configured to identify how many and which virtual machine or machines required to execute a test, the identified virtual machine or machines being available at different points in time to execute different portions of the test;
   a determining module configured to determine the availability of the identified virtual machine or machines; and
   a scheduling module configured to schedule a test execution, the test being executed partially on a first identified virtual machine while the first identified virtual machine is available and then continued on a second identified virtual machine using a differential disk image, the differential disk image containing at least changes made to a disk between two points in time.

10. The system of claim 9 further comprising a virtual differential disk archive that stores one or more differential disk images created to prepare for starting or continuing the test execution.

11. The system of claim 9, further comprising an execution request queue configured to maintain a list of tests to be executed.

12. The system of claim 9, further comprising an investigation request queue configured to maintain a list of tests to be investigated.

13. The system of claim 9 wherein all modules operate on a single computer.

14. The system of claim 9, further comprising at least a first computer and a second computer, wherein at least one of the modules operates on the first computer and at least one of the modules runs on the second computer.

15. One or more computer readable media having instructions stored thereon that, when executed, perform a method comprising:
   determining resources required for running a test;
   determining which combination of virtual machines can provide the required resources;
   selecting a plurality of virtual machines with the required resources available, the selected virtual machines being available at different points in time, according to a timeline, to execute different portions of the test;
   scheduling the test to run on the selected virtual machines; and
   running the test on the selected virtual machines, the test being run partially on a first selected virtual machine while the first selected virtual machine is available and then continued on a second selected virtual machine using a differential disk image, the differential disk image containing changes made to a disk between two points in time.

16. The one or more computer readable media of claim 15 wherein at least one of the selected virtual machines is on a host also used for purposes other than testing.

17. The one or more computer readable media of claim 15 wherein the test is run on more than one virtual machine, using the differential disk image to transfer the test run from one virtual machine to another virtual machine.

18. The one or more computer readable media of claim 15 wherein running the test further includes preparing the virtual machine for the test run, comprising:

installing a virtual machine base image;
installing configuration data required by the test; and
invoking a startup command.

19. The one or more computer readable media of claim 15 wherein the running the test further comprises:
deriving a result; and
storing the result on the differential disk image.

20. The one or more computer readable media of claim 19 wherein the method further comprises:
selecting one or more virtual machines with resources required to investigate the result;
transferring the result to the selected one or more virtual machines; and;
investigating the test on the selected one or more virtual machines.

* * * * *